(12) United States Patent
Williams

(10) Patent No.: US 12,668,206 B1
(45) Date of Patent: Jun. 30, 2026

(54) VEHICLE SURVEILLANCE AND SECURITY SYSTEM

(71) Applicant: Robyn T. Williams, Cincinnati, OH (US)

(72) Inventor: Robyn T. Williams, Cincinnati, OH (US)

( * ) Notice: Subject to any disclaimer, the term of this patent is extended or adjusted under 35 U.S.C. 154(b) by 114 days.

(21) Appl. No.: 18/622,973

(22) Filed: Mar. 31, 2024

Related U.S. Application Data

(60) Provisional application No. 63/456,440, filed on Mar. 31, 2023.

(51) Int. Cl.
| | |
|---|---|
| *B60R 25/102* | (2013.01) |
| *B60R 25/10* | (2013.01) |
| *B60R 25/30* | (2013.01) |
| *B60R 25/33* | (2013.01) |

(52) U.S. Cl.
CPC ........ *B60R 25/102* (2013.01); *B60R 25/1012* (2013.01); *B60R 25/305* (2013.01); *B60R 25/33* (2013.01); *B60R 2025/1016* (2013.01)

(58) Field of Classification Search
CPC ... G06F 1/16; G06F 3/00; G06F 3/041; G06F 3/0482; G09B 29/10; G09G 3/36; G09F 13/16; G01C 21/26; G01C 21/36; B60Q 1/00; B60Q 1/32; B60Q 9/00; H04W 64/00; H04W 64/006; H04W 4/029; G06N 20/00; G07C 5/00; H04N 7/18
See application file for complete search history.

(56) References Cited

U.S. PATENT DOCUMENTS

| | | | |
|---|---|---|---|
| 8,854,465 B1 | 10/2014 | McIntyre et al. | |
| 10,131,274 B1 * | 11/2018 | Chien ..................... | B60Q 1/52 |
| 10,157,541 B2 | 12/2018 | Okazaki et al. | |
| 10,318,828 B2 | 6/2019 | Hampiholi | |
| 11,736,664 B2 | 8/2023 | Harms et al. | |
| 2013/0093894 A1 | 4/2013 | Zlotnikov | |
| 2015/0009327 A1 * | 1/2015 | Love ..................... | H04N 7/181 |
| | | | 348/148 |
| 2018/0253200 A1 * | 9/2018 | Abe ................... | G01C 21/3664 |
| 2021/0120523 A1 * | 4/2021 | Hegde ................ | H04W 64/006 |

* cited by examiner

*Primary Examiner* — Van T Trieu
(74) *Attorney, Agent, or Firm* — Invention To Patent Services; Alex Hobson

(57) ABSTRACT

A vehicle surveillance and security system utilizes a camera to identify suspect vehicles that may have followed the driver's vehicle over a threshold distance to alert the driver of a potential threat. The system may utilize a singe camera, a camera that actuates or a plurality of cameras. A control system with a computing device analyzes the digital images to determine if a suspect vehicle is identified in a first and a second image over a threshold distance that the driver's vehicle has traveled. The system may produce an audible and/or visual alert when a suspect vehicle is detected. The digital images may be stores within memory in the vehicle or may be uploaded to a cloud database. The system may be manually activated by the driver or may be automatically activated when the vehicle stops at a store or bank for a threshold period of time.

18 Claims, 2 Drawing Sheets

VEHICLE SURVEILLANCE AND SECURITY SYSTEM

CROSS REFERENCE TO RELATED APPLICATIONS

This application claims the benefit of priority to U.S. provisional patent application No. 63/456,440, filed on Mar. 31, 2023; the entirety of which is hereby incorporated by reference herein.

BACKGROUND OF THE INVENTION

Field of the Invention

The invention relates to a vehicle surveillance and security system that utilizes a camera or a plurality of cameras to identify suspect vehicles that may have followed the driver's vehicle over a threshold distance to alert the driver of a potential threat.

Background

Criminals have learned that they are likely to be seen or captured on video if they assault someone in a public location. Criminals have been following people for miles in their car to assault them and steal their belongings, or their vehicle. A person collecting cash from a bank machine may get in their car and drive home or to a secondary location where they are assaulted and robbed of their money.

SUMMARY OF THE INVENTION

The invention is directed to a vehicle surveillance and security system that utilizes a camera or a plurality of cameras to identify suspect vehicles that may have followed the driver's vehicle over a threshold distance to alert the driver of a potential threat. An exemplary vehicle surveillance and security system is configured to detect suspect vehicles and provide an alert to the driver. The exemplary vehicle surveillance and security system utilizes a camera or a plurality of cameras to provide surveillance proximal to the driver's vehicle. The system may employ a back-end camera, configured to take images of vehicles behind or around the driver's vehicle and/or a plurality of other cameras, such as a front-end camera configured to take images in front of the driver's vehicle, a driver side camera configured to take images of out from the driver's side of the vehicle, passenger side camera configured to take images out from the passenger side of the vehicle and a top camera configured on a top of the vehicle. One or more of the cameras may be configured to actuate, such a rotate to provide a wider range of surveillance from one camera. A camera may be a rotational camera that is configured to rotate 360 degrees to provide a full panorama around the vehicle.

The camera or plurality of cameras provide images to the control system, which utilizes a computing device to analyze the images provided. A computer software may be operated by the computing device and compare a first image to a second and other subsequent images to determine if a vehicle is recognized in two or more images. This vehicle that is recognized in a plurality of images may be tagged as a suspect vehicle if it has followed the driver's vehicle for more than a threshold distance or from a first stopped location, such as a bank or automatic teller machine (ATM) or mall, to a second stopped location, or destination location, such as the driver's home. The control system may utilize a global positioning system (GPS) to determine the location of the driver's vehicle and may also, recognize a first stopped location and a second stopped location, or destination location.

The threshold distance may be more than three miles or more, or about five miles or more, about ten miles or more, about 20 miles or more, and any range between and including the threshold distances provided. The system may utilize the GPS to recognize stopped locations, such as proximal to a bank or store and also a home location. The vehicle surveillance and security system may automatically initiate if the driver's vehicle is stopped proximal to a bank or store, such as within about 0.5 miles or less, or about 0.25 miles or less, or about 0.1 mile or less and any range between and including the values provide. Also, the vehicle surveillance and security system may be manually activated by the driver or user when they have finished shopping or finished at the bank. The vehicle surveillance and security system may prompt the driver or user to activate the system when the vehicle surveillance and security system detects that the vehicle was stopped proximal to a store or bank, as described herein, for more than a threshold time, such as for more than about two minutes, more than about five minutes, more than about ten minutes, more than about 30 minutes and any range between and including the threshold times provided.

The images taken by the camera(s), including the images of suspect vehicles may be stored in data storage within the vehicle and/or may be uploaded to a cloud database having cloud data storage. The cloud storage may enable subsequent review should the driver's vehicle be stolen or if there is an emergency situation or a crime requiring further review of these images. The images may also be stored within data storage or memory within the vehicle. The driver or user may be prompted to delete images or videos after a certain period of time or the images may automatically be deleted after a threshold period of time.

An image as used herein, is a digital image and may be a still or moving image. The control system and the computer program may preferably use still digital images for analysis and comparison from a first to a second image to determine if there is a suspect vehicle that is following the driver's vehicle.

A driver, as used herein, may be a person configured to operate the vehicle an may not actually drive the vehicle, as the vehicle may be automatically driven from a first location to a second location. A driver therefore is a person manually driving the vehicle or providing instructions to the vehicle to move from a first location to a second location.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
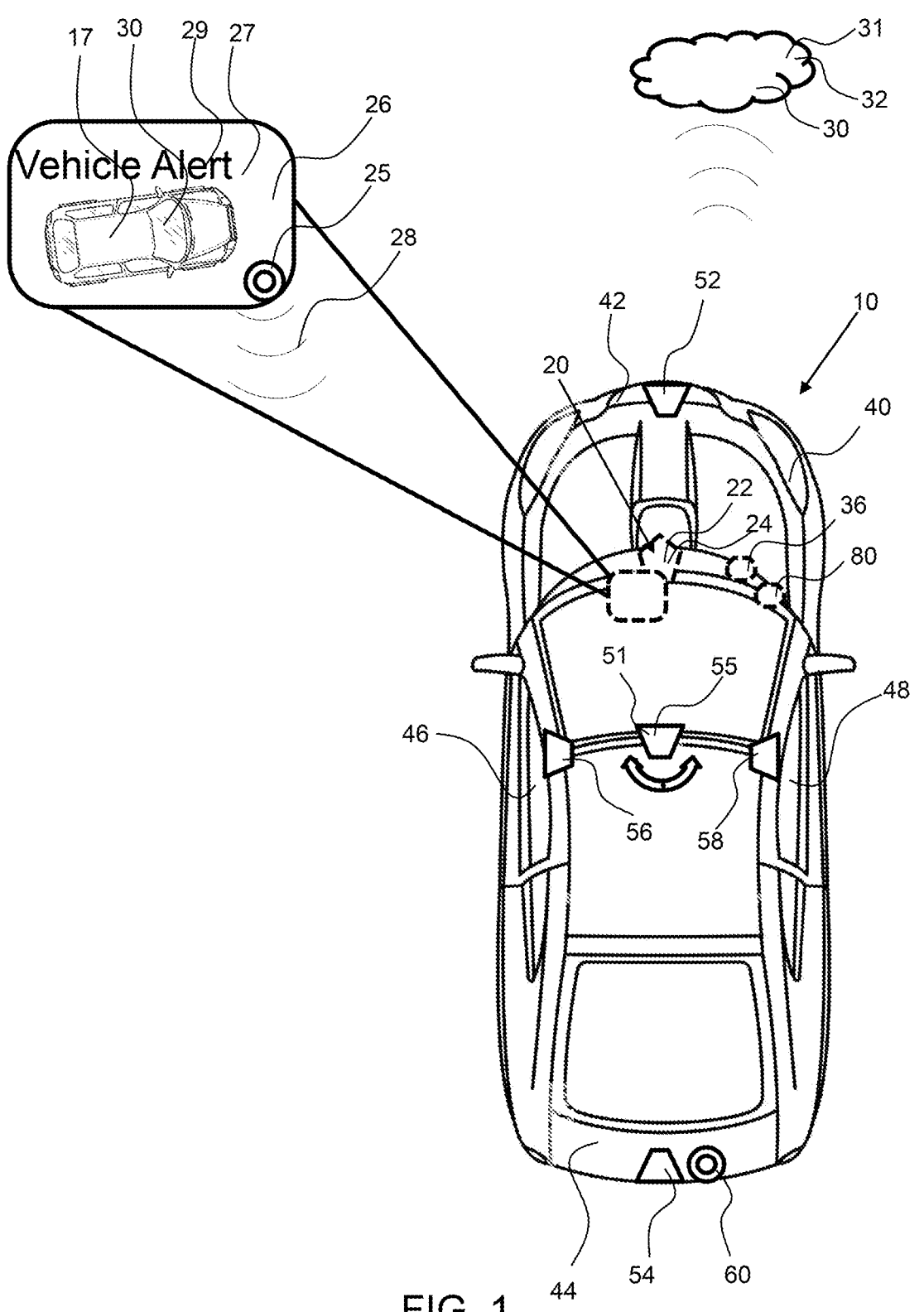
FIG. 1 shows a vehicle with an exemplary vehicle surveillance and security system configured to detect following vehicles and provide alerts to the driver.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Figure 2:
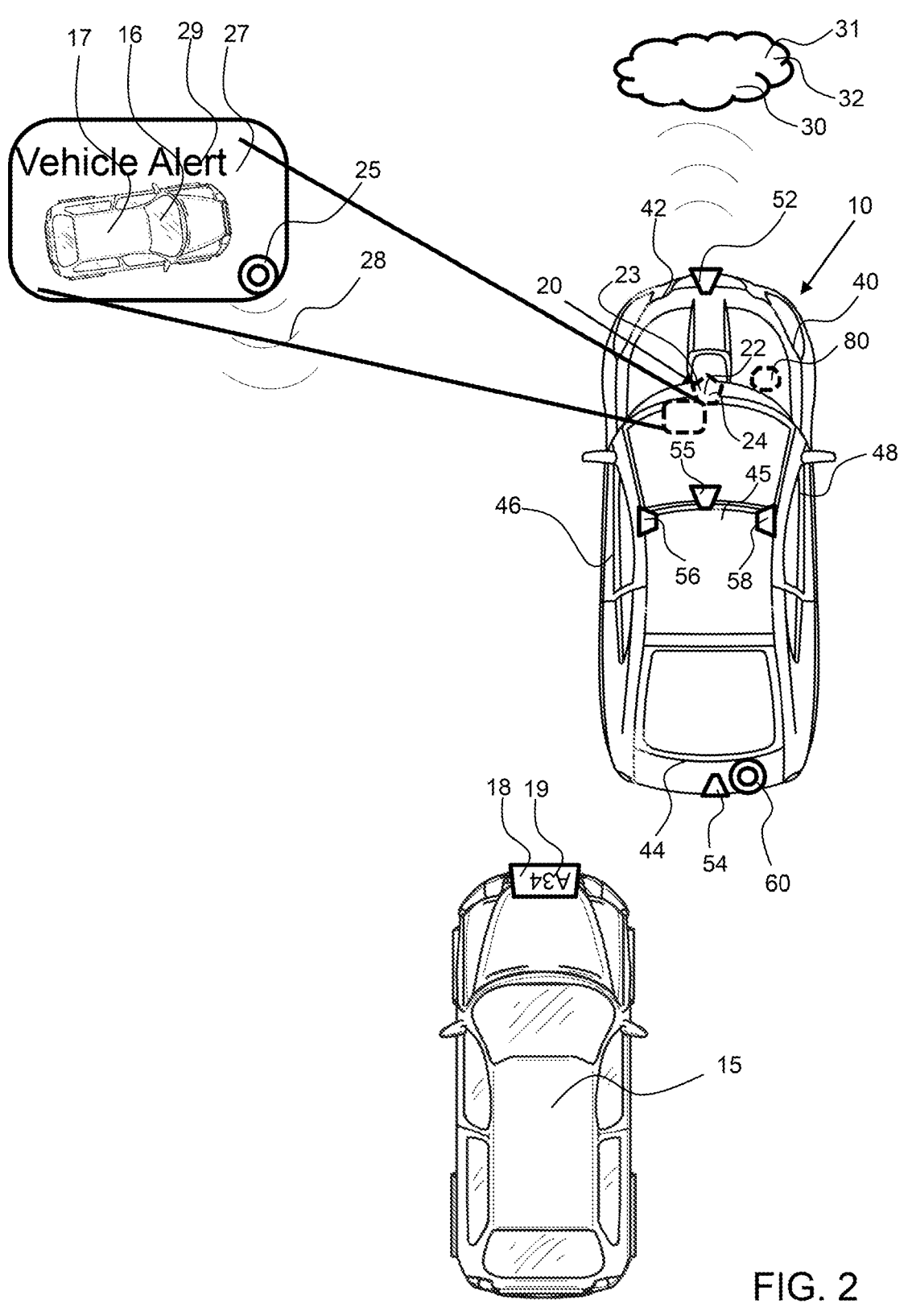
FIG. 2 shows the vehicle surveillance and security system shown in FIG. 1 identifying a suspect vehicle that has followed the driver's vehicle for more than a threshold distance.

Referring to FIGS. 1 and 2, a vehicle 40 is equipped with an exemplary vehicle surveillance and security system 10 that is configured to detect suspect vehicles 15 and provide an alert to the driver. The exemplary vehicle surveillance and security system 10 utilizes a camera or a plurality of cameras to provide surveillance proximal to the driver's vehicle 40. The system may employ a back-end camera 54, that may be configured on the back 44 of the driver's vehicle 40 and configured to take back images of vehicles behind the driver's vehicle and/or a plurality of other cameras. A front-end camera 52 may be configured to take front images in front 42 of the driver's vehicle 40. A driver side camera 56 may be configured to take driver side images, or images out from the driver's side 46 of the vehicle A passenger side camera 58 may be configured to take passenger-side images, or images out from the passenger side 48 of the vehicle. A top camera 55 may be configured on a roof 45, or top panel over the cabin of the vehicle, and may take images in any one of the aforesaid directions or may rotate to take panoramic images. One or more of the cameras may be configured to actuate, such as rotate to provide a wider range of surveillance from one camera. A camera may be a rotational camera 51 that is configured to rotate 360 degrees to provide a full panorama around the vehicle.

The camera or plurality of cameras provide images to the control system 20, which utilizes a computing device 24 to analyze the images provided. A computer software 23 may be operated by the computing device and compare a first image to a second and other subsequent images to determine if a vehicle is recognized in two or more images. This vehicle that is recognized in a plurality of images may be tagged as a suspect vehicle if it has followed the driver's vehicle for more than a threshold distance or from a first stopped location to a second stopped location, or destination location. The control system may utilize a global positioning system 80 to determine the location of the driver's vehicle 40 and may also, recognize a first stopped location and a second stopped location, or destination location. The images taken by the camera(s), including the images of suspect vehicles may be stored in data storage 22 within the vehicle and/or may be uploaded to a database 31, such as a cloud database 30 having cloud data storage 32. The control system may interface with a wireless transmitter 36 to send digital images 17 to the cloud database 30. The cloud storage may enable subsequent review should there be an emergency situation or a crime requiring further review of these images.

As shown in FIG. 1, the driver's vehicle 40 may have a display device 27 that shows images taken by the camera or cameras. The display device may be a screen and may be a touch screen that acts as a user interface to activate the system. The display may show a suspect vehicle display 16 and an alert, such as a visual alert 29 may be displayed on the display device 27. Also, an audible alert 28 regarding a suspect vehicle may be emitted from a speaker 25. These alerts may inform the driver that a suspect vehicle has followed them from a first location to a second location, such as from a bank machine, where they collected cash, to their home.

An exemplary vehicle surveillance and security system 10 may incorporate a microphone 60 that monitors the sound of a suspect vehicle 15. The sound may be used to further identify and track the suspect vehicle. Many vehicles may be identified by a particular sound the engine makes. The make and/or model of the vehicle may be determined by the sound of the suspect vehicle or by a combination of the sound and digital image or a plurality of digital images taken by one or more of the cameras described herein. The vehicle surveillance and security system may compare the sound and/or images with those in the database 31 to accurately identify the make and model of the suspect vehicle. Also, the vehicle surveillance and security system 10 may analyze a digital image to determine a license plate number 19 on a license plate 18 of a suspect vehicle 15. The license plate number and state of registration may be provided to authorities in the event that the system determines that the suspect vehicle is following the vehicle.

In an exemplary method, the driver may use the user interface 26, such as a touch screen on the display, to activate a surveillance mode and thereby activate the control system to take images of surroundings of the driver's vehicle to determine if there is a following suspect vehicle. As shown in FIG. 2, a suspect vehicle 15 has followed the driver's vehicle for more than a threshold distance and the control system has produced both a visual alert 29 showing a digital image 17 of the suspect vehicle on the display device 27 and an audible alert 28 from the speaker 25.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A vehicle surveillance and security system comprising:
   a) a vehicle;
   b) a camera coupled to said vehicle and configured to take a first image at a first location and a second image at a second location; and
   c) a control system configured to receive said images and comprising:
      i) a computer software,
      ii) a computing device configured operate the computer software; and
      iii) at least one of a visual alert and audible alert; and
      iv) data storage for storing said first image and said second image;
   wherein the control system is configured to produce an alert to a driver of said vehicle, when a suspect vehicle is recognized in both of said first image and said second image;
   d) a global positioning system and wherein the threshold distance is determined by the global positioning system;
   wherein the control system only produces said alert when the second location is a threshold distance from said first location, wherein the threshold distance is at least three miles and wherein the threshold distance is determined by said global positioning system.

2. The vehicle surveillance and security system of claim 1, wherein the camera is a back-end camera configure to take images behind said vehicle.

3. The vehicle surveillance and security system of claim 2, comprising a plurality of cameras including said back-end camera configured to take images of said suspect vehicle behind said vehicle and a front-end camera configured to take images in front of said vehicle.

4. The vehicle surveillance and security system of claim 2, comprising a plurality of cameras including said back-end camera configured to take images of said suspect vehicle behind said vehicle and a driver-side camera configured to take images out from a driver's side of said vehicle.

5. The vehicle surveillance and security system of claim 2, comprising a plurality of cameras including said back-end camera configured to take images of said suspect vehicle behind said vehicle and a passenger-side camera configured to take images out from a driver's side of said vehicle.

6. The vehicle surveillance and security system of claim 1, comprising a plurality of cameras including said back-end camera configured to take images of said suspect vehicle behind said vehicle and a passenger-side camera configured to take images out from a driver's side of said vehicle.

7. The vehicle surveillance and security system of claim 1, comprising a plurality of cameras including said back-end camera configured to take images of said suspect vehicle behind said vehicle and a top camera configured to take images around said vehicle.

8. The vehicle surveillance and security system of claim 7, wherein the top camera is an actuating camera that actuates to take images around said vehicle.

9. The vehicle surveillance and security system of claim 1, wherein the global positioning system is configured in said vehicle.

10. The vehicle surveillance and security system of claim 1, wherein the control system is configured to produce said alert to a driver when a first location is a store or bank and wherein the second location is a home of said driver.

11. The vehicle surveillance and security system of claim 1, wherein threshold distance is at least five miles.

12. The vehicle surveillance and security system of claim 1, wherein the threshold distance is at least ten miles.

13. The vehicle surveillance and security system of claim 1, wherein the data storage for storing said first image and said second image is in the vehicle.

14. The vehicle surveillance and security system of claim 1, wherein the control system further comprises a wireless transmitter configured to send said first image and said second image to a cloud database having cloud data storage to store said first image and said second image.

15. The vehicle surveillance and security system of claim 1, wherein the control system further comprises a display device and wherein said suspect vehicle is displayed on the said display device when said alert is provided to the driver.

16. The vehicle surveillance and security system of claim 15, wherein the alert is a visual alert that is on a display device.

17. The vehicle surveillance and security system of claim 1, further comprising a user interface, wherein the driver can activate or deactivate the system.

18. The vehicle surveillance and security system of claim 1, comprising a plurality of cameras comprising:
   a) a back-end camera configured to take images of said suspect vehicle behind said vehicle;
   b) a front-end camera configured to take images in front of said vehicle;
   c) a driver-side camera configured to take images out from a driver's side of said vehicle; and
   d) a top camera top camera configured to take images around said vehicle;
      wherein the top camera is an actuating camera that actuates to take images around said vehicle;
      wherein the control system is configured to produce said alert to a driver when a first location is a store or bank and wherein the second location is a home of said driver;
      wherein the alert is an audible alert emitted from a speaker in said vehicle; and
      wherein the control system further comprises data storage for storing said first and said second images;
      wherein the control system further comprises a wireless transmitter configured to send said first image and said second image to a cloud database having cloud data storage to store said first image and said second image.

* * * * *